Jan. 10, 1967 G. T. SHIMABUKURO 3,297,999

MULTI-PROGRAMMING COMPUTER

Filed Aug. 26, 1963 5 Sheets-Sheet 1

INVENTOR.
GEORGE T. SHIMABUKURO
BY
Christie, Parker & Hale
ATTORNEYS.

Jan. 10, 1967 G. T. SHIMABUKURO 3,297,999

MULTI-PROGRAMMING COMPUTER

Filed Aug. 26, 1963 5 Sheets-Sheet 2

MULTI-PROGRAMMING COMPUTER

Filed Aug. 26, 1963 5 Sheets-Sheet 2

Jan. 10, 1967 G. T. SHIMABUKURO 3,297,999

MULTI-PROGRAMMING COMPUTER

Filed Aug. 26, 1963 5 Sheets-Sheet 4

INVENTOR.
GEORGE T. SHIMABUKURO

BY

Christie Parker & Hale

ATTORNEYS.

Jan. 10, 1967 G. T. SHIMABUKURO 3,297,999

MULTI-PROGRAMMING COMPUTER

Filed Aug. 26, 1963 5 Sheets-Sheet 5

3,297,999

MULTI-PROGRAMMING COMPUTER

George T. Shimabukuro, Monterey Park, Calif., assignor to Burroughs Corporation, Detroit, Mich., a corporation of Michigan Filed Aug. 26, 1963, Ser. No. 304,423
18 Claims. (Cl. 340—172.5)

This invention relates to digital processing systems and, more particularly, is concerned with an internally programed computer capable of operating on a number of programs at one time on a time sharing basis.

As the speed of digital computers has increased, there has been a constant effort to make more efficient use of the high speed capability of the computing system. Not all parts of a computing system operate at the same high speed. The problem then is to coordinate the activities of the various elements of the computing system to have each element operating at its maximum capacity. One technique which has been developed to improve the overall operating efficiency of a computing system has been the concept of multiprogramming. In multiprogramming, the computer is provided with a number of different programs. In its simpler form, multiprogramming merely means that the computer is arranged to operate on a number of programs in sequence. Techniques have been developed whereby the computer can be caused to switch from one program to another whenever it is interrupted in the processing operation for any one of a number of reasons. It has been the practice heretofore to provide a means by which an interrupt in a processing operation initiates a master control program. The master control program functions to store the information in the various memory units and registers to clear the processors for operation on another program.

In copending application Serial No. 232,016, filed October 22, 1962, in the name of William A. Logan et al. and assigned to the same assignee as the present invention, there is described a data processing system which utilizes the principles of a special form of algebraic notation, developed by the Polish mathematician J. Lukasiewicz, in which all parentheses are eliminated by having the operator, such as add, multiply, etc., follow the operands involved in the operation. The result is then utilized as an operand in the same sequence. Implementing this type of notation requires some temporary storage in which operands can be stored on a last-in, first-out basis. Such a memory has been referred to as a "stack" memory because the operands can be considered as being placed in the memory by stacking one on top of the other and then removing them in the reverse order, i.e., taking the operands off the top of the stack.

Multiprogramming in a computer of this type requires that the contents of the stack be stored elsewhere or at least the information as to the address at the top of the stack must be stored at the time the computer is transferred to another program in order that the stack may be returned to its same condition when the prior program is again resumed at a later time. This arrangement also requires that there be a new operator for each operation performed on any of the operands in the stack. This presents a disadvantage in speed of operation and in efficient use of memory space in situations where one operation is to be repeated many times. For example, where it is desirable to add up long columns of figures, such an arrangement requires a separate add operator each time two operands are to be added together or where an operand is to be added to the results of the previous additions.

The present invention provides an improved data processing system utilizing the advantages of multiprogramming. The computing system is arranged such that it can automatically switch to another program when a particular piece of equipment such as an arithmetic unit is tied up doing one program step of another program. Automatic switching between programs is accomplished by providing a group of program control words, each word having control information for a different program. The program control words can be transferred to different units of the processor to control the particular unit in performing a particular step or series of steps in the program established by that control word. Thus several different units of the processing system can be operating on different programs simultaneously by transferring different program control words to the various units.

A single stack memory can be used for a plurality of programs, according to the arrangement of the present invention, by linking the words together which are placed in the stack. Each program control word sets up a different linkage system so that the stacks for each program are kept separate although sharing a common memory unit.

An additional feature of the present invention is that a single operator may be repeated any number of times on a stack of operands. This is accomplished by providing that an operator automatically be repeated on all of the operands derived from the stack, the operator terminating only when the last operand in a series of operads is removed from the stack, as identified by a flag bit in that operand word.

These and other advantages of the present invention are achieved by providing a computer system which includes a main memory for storing instructions and operands in coded form relating to a plurality of separate programs, a temporary storage facility or stack memory for storing a plurality of operands in addressable locations on a last-in, first-out basis, and a plurality of separate arithmetic units. A high speed memory is provided for storing a plurality of program control words, each control word having information relating to a particular program, including information as to the address of the next instruction in the main memory, the address of the last operand placed in the temporary storage means for the particular program, and the arithmetic operation called for by the last instruction in the program. An address register stores the address of the next location in the temporary storage means.

A fetch operation is initiated by transferring a program control word from the high speed memory to a control unit associated with the main memory and the stack memory. The address of the next instruction in the program control word is used to read out the next instruction from the main memory. The address of the program control word is then advanved to the address of the next instruction and the operator portion of the instruction is placed in the program control word. The instruction may include the address of an operand in the main memory to be transferred from the main memory to the temporary storage facility.

The placing of the operand in the temporary storage facility or stack memory is accomplished by utilizing the address in the address register. The address in the address register is first used to read out a link address from the corresponding location in the stack memory. The link address is then placed in the address register to provide an address for the next operand to be transferred to the stack memory. At the same time, the existing address in the register is transferred to the program control word, replacing the address of the last operand. The last operand address in the control word, in turn, is transferred back into the stack memory together with the operand addressed by the instruction. In this manner, the stack memory and address register identify the address of the top of the stack, the address position for the next operand to be placed in the stack, and the address of the last operand to be placed in the stack.

Each of the arithmetic unit is arranged to store a pair of operand and perform arithmetic operations on said operands. An arithmetic operation is initiated by transferring a program control word from the high speed memory to an available arithmetic unit. Using the address information on the last operand placed in the stack, operands are transferred to the arithmetic unit from the stack memory in the reverse order in which they were placed in the stack memory. The arithmetic operation designated by the program control word is repeated on a succession of operands until a flag bit in the last of the series of operands stops the arithmetic operation. At this point, the program control word is returned to the high speed memory and the result of the arithmetic operation is placed back in the stack memory so that the arithmetic unit is now available for operation in connection with another program.

These and other advantages of the present invention will be more fully understood by reference to the accompanying drawings wherein:

FIGURE 3 is a schematic block diagram of the fetch operation portion of the computer system by which single address instructions associated with a particular program are fetched from memory and operands are placed in the stack memory under the control of a selected program word;

Figure 4:
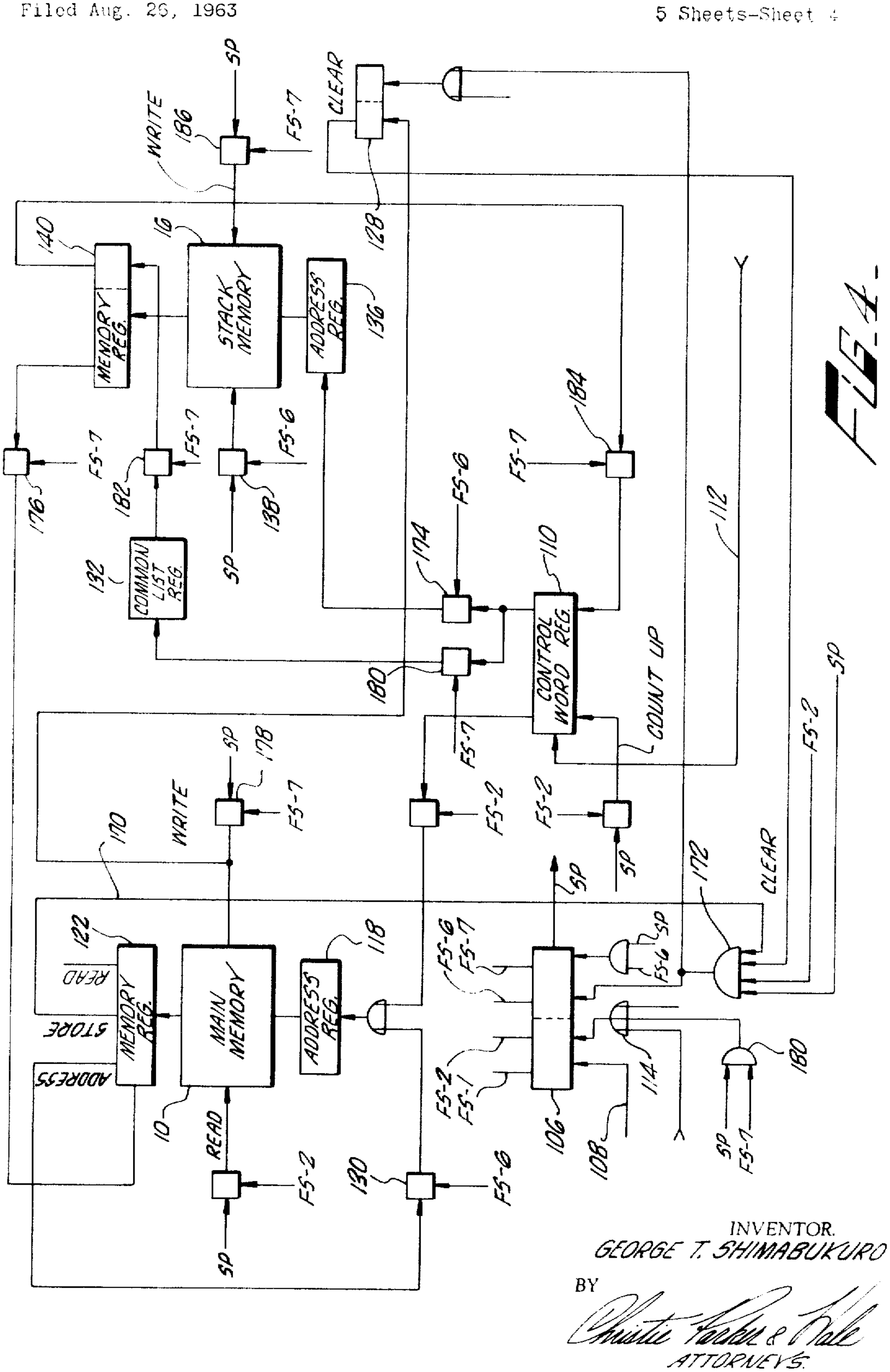
Figure 5:
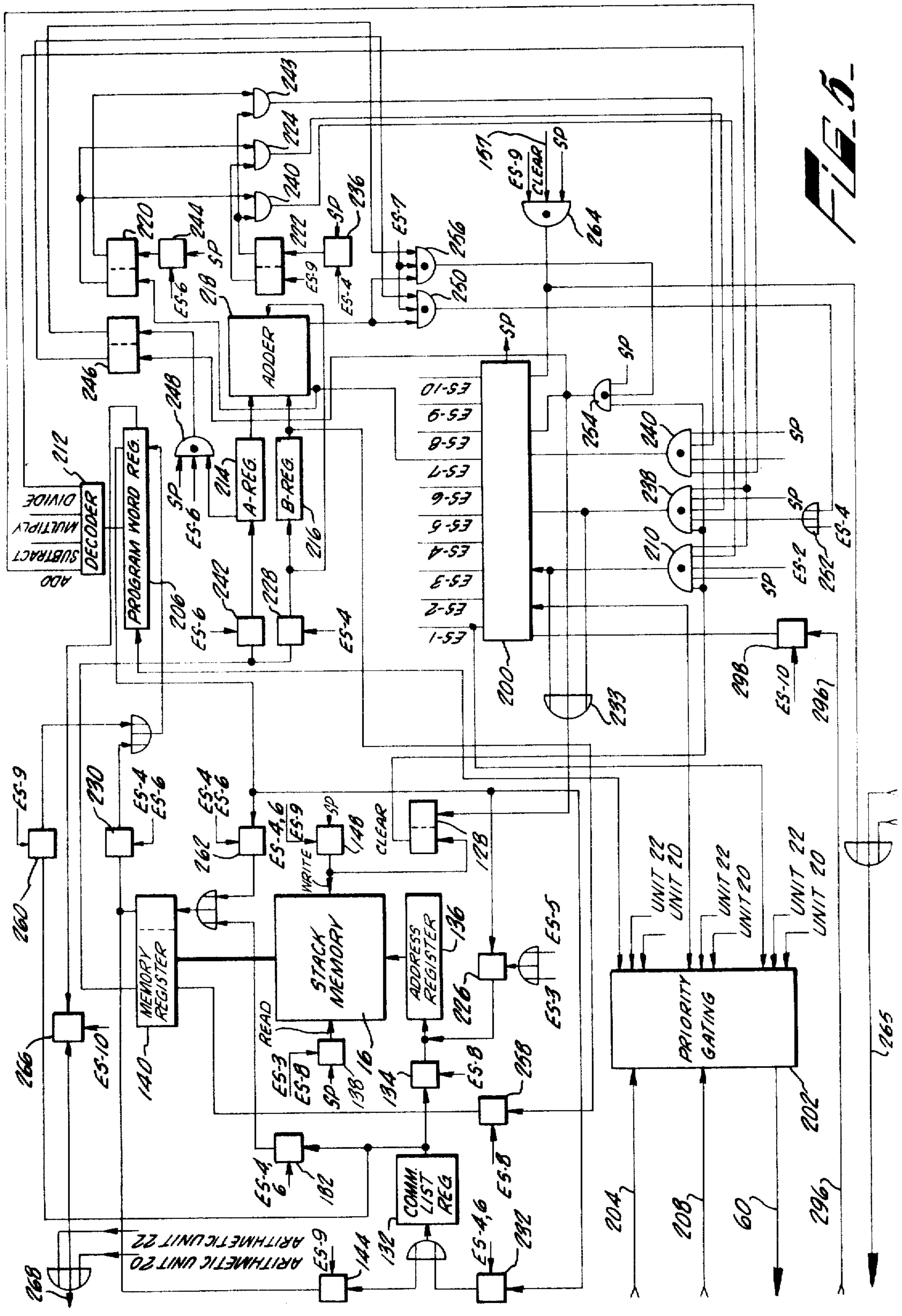

FIGURE 4 is a similar schematic block diagram showing the control apparatus necessary to effect transfer of operands from the stack memory to the main memory of the computing system for a selected program; and FIGURE 5 is a schematic block diagram of the arithmetic unit and associated control circuits used in performing particular operations in combination with the stack memory under control of a program control word.

Figure 1:
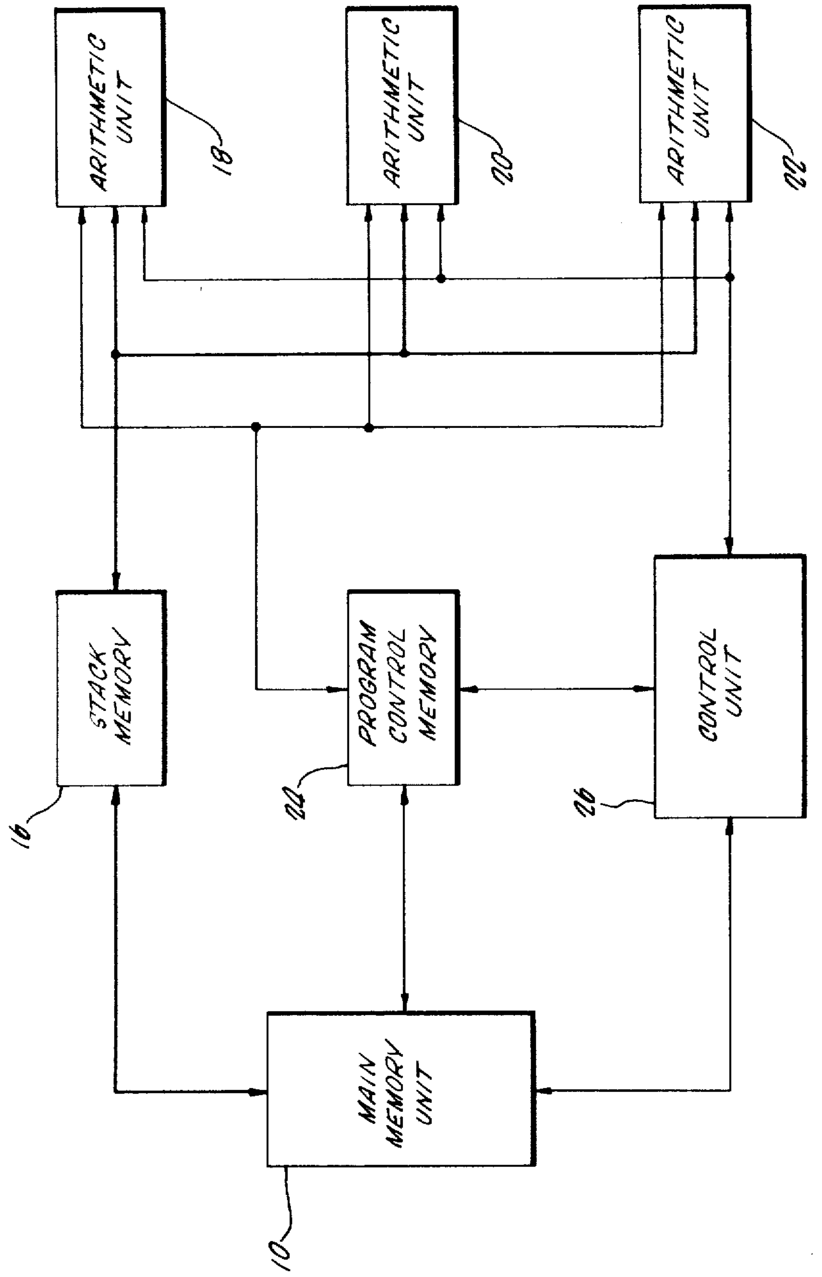
FIGURE 1 is a block diagram of the basic units of a computing system according to the present invention.

Referring to FIGURE 1, the data processing system is shown as including a main memory unit 10. Information flow is shown by the heavy black lines as extending between the main memory unit and a temporary storage facility in the form of a stack memory 16. The main memory unit 10 may be in the form of a core memory, a drum or disk memory, or the like. The type of memory is not material to the present invention. Stack memory 16 is preferably a random access memory such as a high speed core memory or thin film memory. It preferably is a higher speed memory than the main memory unit.

The stack memory 16 in turn communicates with any one of a plurality of arithmetic units indicated at 18, 20 and 22. The number of arithmetic units is not material to the present invention and this system may be operated effectively with only a single arithmetic unit.

In multiprogramming operation of the processing system, a plurality of control words are provided which are stored in the program control memory indicated at 24. This is preferably a very high speed memory such as a thin film memory which stores one program control word for each program on which the processor is to be run. The program control memory 24, for example, may store up to sixty-four program control words, permitting as many as sixty-four different programs to be utilized by the processing system.

The fetching and executing operations associated with each program are carried out by a control unit 26 in combination with the program control words derived from the program control memory 24. Because the stack memory 16 has relatively high speed, it can be time shared with the main memory unit during the fetch operation and the various arithmetic units during execute operations under a number of different programs. Thus each arithmetic unit and the main memory unit may be operating in conjunction with a different program at any given time.

Figure 2:
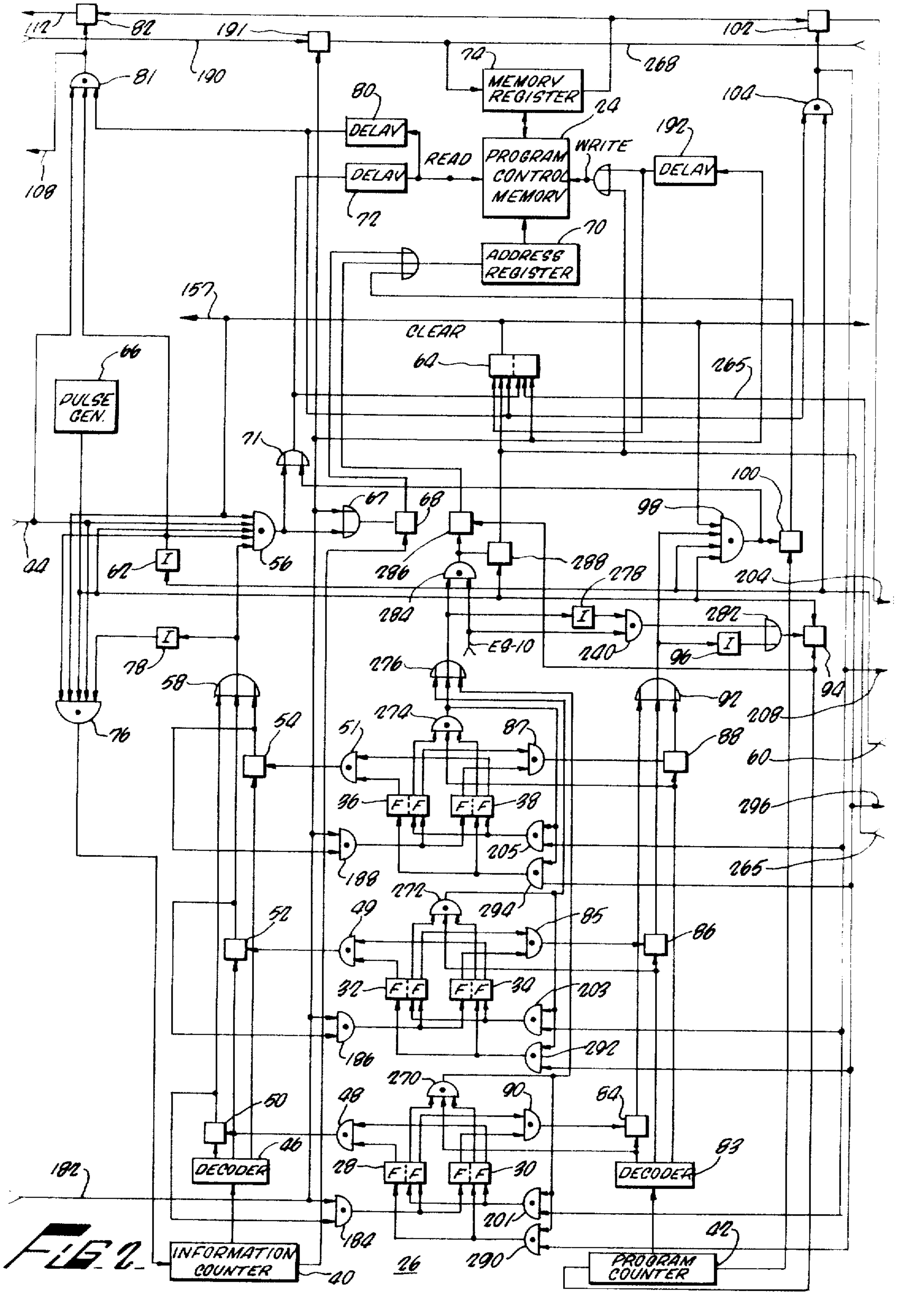
FIGURE 2 is a schematic block diagram of the multiprogramming control features of the present invention.
Figure 2:
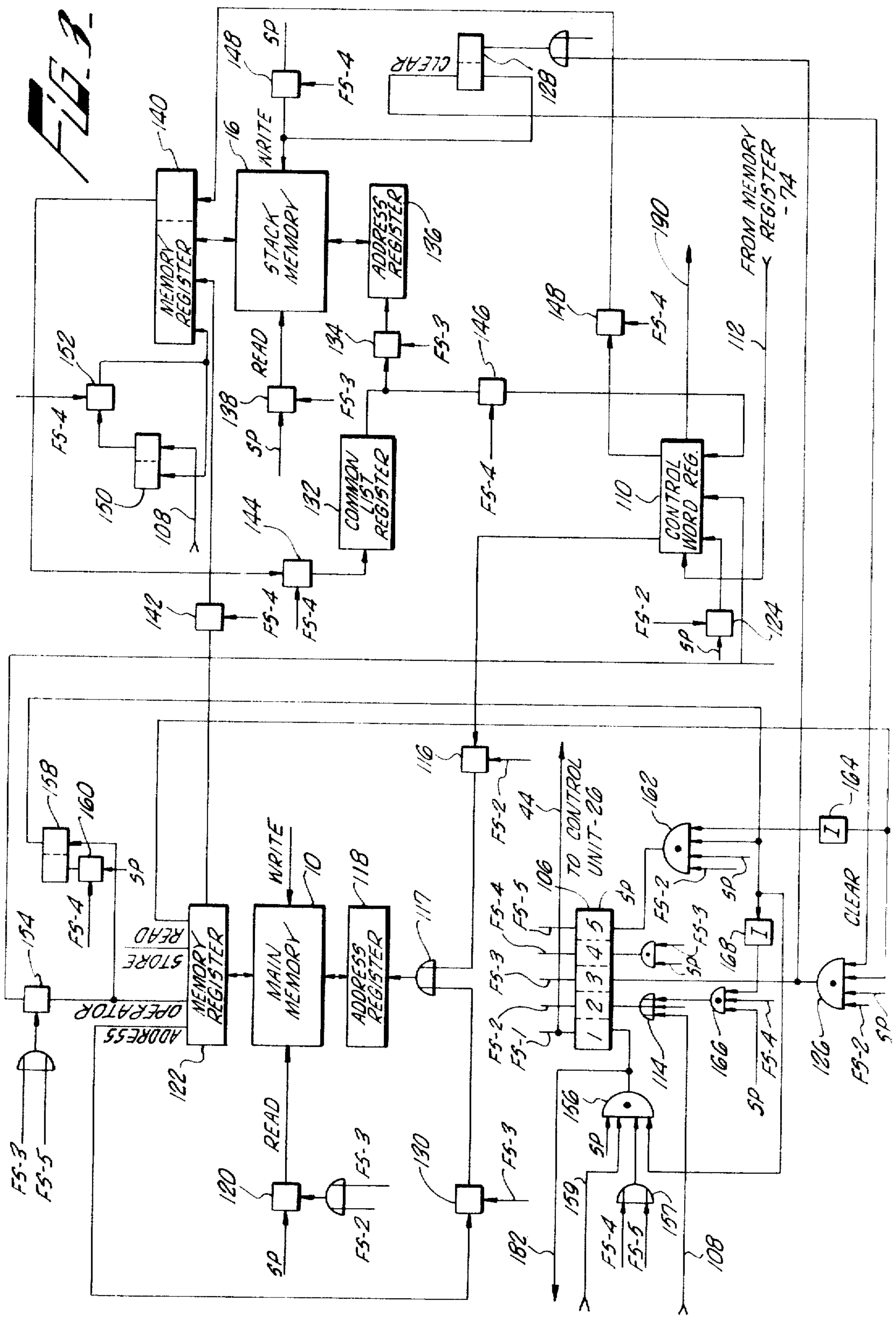

Referring to FIGURE 2, the program control memory 24 and associated control unit 26 are shown in more detail. Each storage position in the program control memory 24 has associated therewith a pair of flip-flops, only three pairs of which are shown in FIGURE 2 at 28 and 30, 32 and 34, and 36 and 38. Each pair of flip-flops is coded to identify four conditions of operation associated with the program control word in the corresponding location in the memory 24. Assuming each flip-flop has a reset and a set state, when the pair of flip-flops are both in the reset state, by definition this indicates that there is no program control word associated with that location in the memory 24. If the left-hand flip-flop is in the reset state and the right-hand flip-flop is set, it indicates that the associated program is free to do a fetch operation. If the left-hand flip-flop is set and the right-hand flip-flop is in the reset state, it indicates that the associated program is ready for an execute operation by an arithmetic unit. When both the flip-flops are in the set state, it indicates that the associated program is being processed.

The fetch operation requires that a program control word be transferred from the memory 24 to the main memory unit 10 where the control word operates to fetch single address instructions from the memory and to transfer operands between the main memory and the stack memory 16 in accordance with the instructions.

The execute operation requires that a program control word be transferred from the memory 24 to an arithmetic unit where it controls the execution of a particular instruction using the operands derived from the stack memory 16. Whether a particular program is available for either a fetch operation or an execute operation is determined by the condition of the associated pairs of flip-flops 28–38.

These flip-flops are scanned in pairs to determine their state by means of two counters, an information counter 40 associated with the fetch operations and a program counter 42 associated with the execute operations.

For the purpose of explanation of the operation of the control unit 26 in controlling the porgram control memory 24, let it be assumed for the present that the main memory unit 10 is free to do a fetch operation and that all of the arithmetic units are engaged in doing execute operations. When the main memory unit is free to do a fetch operation, it produces a high level on a line 44 going to the control unit 26. See FIGURE 2. This level indicates that a program control word is required in the main memory unit to go forward with a fetch operation. The control unit 26 in response to a high level on the line 44 scans the pairs of flip-flops in sequence to determine which program control word is free to be used for a fetch operation. This scanning is accomplished by means of the information counter 40.

The counter 40, which is preferably a binary counter, has one count condition for each storage position in the memory 24. Thus it provides a means for establishing an address for each word in the program control memory 24. The condition of the counter 40 is sensed by a decoder 46 which energizes one of N output lines, where N corresponds to the number of storage positions in the memory 24. For simplicity, only three lines are shown corresponding to the three pairs of flips-flops shown. The condition of the flip-flops 28 and 30 is sensed by a logical and gate 48 which produces a high level when the flip-flop 28 is in the reset condition and the flip-flop 30 is in the set condition as required to indicate the associated program is free to do a fetch operation. Similar logical and circuits 49 and 51 sense the corresponding conditions of the flip-flops 32 and 34 and the flip-flops 36 and 38. Assuming the counter 40 is in its initial count condition, a high level may be produced at the output of a gate 50 to which the first line from the decoder 46 is applied together with the output of the logical and circuit 48. Similar gates 52 and 54 sense each of the other count conditions of the counter 40 and the condition of the associated pairs of flip-flops 32 and 34 and flip-flops 36 and 38 respectively. Thus as the counter 40 is advanced, it will produce a high level at the output of any of the gates 50, 52 and 54 in which the associated flip-flops are in required states.

The outputs of the gates 50, 52 and 54 are applied to a logical and gate 56 through a logical "or" gate 58. The line 44 is also applied to the logical and gate 56 as well as three other lines.

An input line 60 to the control unit 26 has a high level applied to it when an arithmetic unit is calling for a program control word. In order to give priority to an arithmetic unit in a situation where both an arithmetic unit and the main memory unit are calling for a program control word, the line 60 is applied through an inverter 62 to the logical and gate 56. Thus the output of the logical and gate 56 can only go high if the line 60 is at a low level, indicating that all of the arithmetic units are engaged.

Another input to the logical and gate 56 is derived from a flip-flop 64 which is normally in its reset state when the program control memory 24 is free to do a memory cycle. Also a clock pulse is derived from a pulse generator 66 and applied to the logical and gate 56. It will be seen, then, that this pulse is passed by the logical and gate 56 when the main memory unit is calling for a program control word as evidenced by the high level on the line 44, no arithmetic unit is calling for a program control word as evidenced by a low level on the line 60, the counter 40 is in a count condition corresponding to the address of a program control word in the memory 24 which is available for initiating a fetch operation, as indicated by the state of the associated pair of flip-flops.

The pulse passed by the logical and gate 56 and a logical or circuit 67 transfers the contents of the counter 40 by means of a gate 68 to an address register 70 associated with the memory 24. The same pulse is applied by means of a logical or circuit 71 through a slight delay introduced by a delay circuit 72 to the memory 24 to cause the addressed program control word to be transferred from the memory 24 to a memory register 74. The program control word is then available for transfer from the memory register 74 to the main memory unit.

If the counter 40 is addressing a program control word which is in use in either the main memory unit 10 or one of the arithmetic units 18–22, the associated pair of flip-flops will not be in the proper state to produce a high level at the output of the logical or gate 58. The counter 40 is then advanced through each count condition until it selects a pair of flip-flops which are in the proper state. The counter 40 is advanced by pulses derived from the pulse generator 66 through a logical and circuit 76, to which is also applied the output of the logical or circuit 58 through an inverter 78. Thus the counter 40 is only counted when the output of the logical or gate 58 is at a low level. The logical and gate 76 also senses that the line 44 is at a high level, indicating that the main memory unit is calling for a program control word and also senses that the line 60 is at a low level, indicating that no arithmetic unit is calling for a program control word.

It should be noted that the flip-flop 64 is turned on by the output pulse from the logical or circuit 56, indicating that the memory 24 is now tied up for a memory access operation. The flip-flop 64 is reset by the READ pulse derived through a delay circuit 80. The same pulse derived from the output of the delay circuit 80 is applied to a logical and circuit 81 together with the line 44 and the output of the inverter 62 and is then used to gate the program word now in the register 74 through a gate 82 to the main memory unit, thus completing the operation of transferring a program control word to the main memory unit. The program control memory is now free to supply program control words to any of the arithmetic units. While the main memory unit is undergoing a fetch operation, the counter 40 remains at the address of the program control word transferred to the main memory unit.

Operation of the program control memory 24 and control unit 26 during an execute operation is as follows. When an arithmetic unit is free to execute an arithmetic operation, it provides a high level on the line 60 which initiates a search for a program control word for a program which is in condition to do an arithmetic operation. The count condition of the counter 42 is applied to a decoder 83 which raises one of N output lines to a high level depending upon the condition of the counter. Each of these lines, only three of which are shown by way of example, are applied respectfully to and gates 84, 86 and 88. The and gate 84 also derives a signal from the first pair of flip-flops 28 and 30 by means of a logical and circuit 90 which senses that flip-flop 28 is in the set state and the flip-flop 30 is in the reset state. Similarly, logical and circuits 85 and 87, coupled to the gates 86 and 88, sense the condition of the flip-flops 32 and 34 and the flip-flops 36 and 38. As pointed out above, this condition of the pair of flip-flops determines whether the associated program is ready for an execute operation.

The outputs of the and gates 84, 86 and 88 are applied to a logical or circuit 92 which produces a high level at the output only when the counter 42 is at a count condition corresponding to a program word in the memory 24 which is ready for an execute operation as determined by the condition of the associated pair of flip-flops. Until the output of the or gate goes high, a gate 94 is opened through an inverter 96 permitting pulses from the pulse generator 66 to be applied to the counter 42 for advancing the counter until the output of the or gate 92 goes high. The counting of the counter 42 is then interrupted. At the same time, the high level is applied to a logical and circuit 98 to which is also applied the output of the pulse generator 66, the line 60 from the arithmetic units and the output of the flip-flop 64, indicating that the memory 24 is free. The pulse passed by the logical and circuit 98 is applied to a gate 100 for transferring the contents of the counter 42 to the address register 70. At the same time, the pulse is passed through the logical or circuit 71 and delay circuit 72 to the READ input of the memory 24. As a result, the selected program word is transferred to the memory register 74. From the register 74, the control word is transferred to one of the arithmetic units through a gate 102 by the pulse derived from the delay circuit 80, which pulse is applied to the gate 102 through a logical and circuit 104 to which the level of the line 60 is also applied.

Referring to FIGURE 3, the associated control circuitry for carrying out the fetch operation between the main memory unit and the stack memory 16 is shown in more detail.

The fetch operation is under a fetch control circuit 106 which is arranged to advance through a plurality of states, each state providing a high level on a corresponding output line such as the output lines FS–1 through FS–5. In addition, the control unit 106 provides a sequence pulse, designated SP, at periodic intervals. The control unit is initially in the FS–1 state. This initial state provides a high level on the line 44 going to the control unit 26 described above in connection with FIGURE 2. The control unit 106 stays in this state until a pulse is received on a line 108 coming from the output of the logical and circuit 81 of FIGURE 2. This is the same pulse that causes the program control word to be transferred from the memory register 74 through the gate 82 to a program control word register 110 over the line 112. The pulse over the line 108 is applied to the control circuit 106 through a logical or circuit 114 to advance the control circuit 106 from the FS–1 to the FS–2 state.

During the FS–2 state, an address stored as part of the program control word in the register 110 is transferred by means of a gate 116 through a logical or circuit 117 to the address register 118 associated with the main memory 10. The next SP generated by the control unit 106 is applied to the main memory 10 through a gate 120 to which the FS–2 state is also applied to cause the addressed word in the main memory 10 to be transferred to an associated memory register 122. This will be a single address instruction word in the sequence of instructions forming the particular program with which the program control word in the register 110 is associated. It should be noted that during the FS–2 state, the address in the register 110 is counted up one by means of an SP passed by a gate 124 during the FS–2 state, thus advancing the address by one for fetching the next instruction.

The single address instruction word includes the address of a location in the main memory 10 where an operand is stored or is to be stored. One bit in the instruction word indicates whether a Store operation is to take place or a Read operation is to take place. In the Store operation, an operand is transferred from the stack memory 16 to the identified address location in the main memory 10. In the Read operation, the addressed operand in the main memory 10 is transferred to the stack memory 16. In addition, the instruction may include an operator calling for a particular arithmetic or a logical operation, such as an add, subtract, multiply, divide or the like.

Assuming that a Read operation is called for by the instruction, which would normally be the case for the first instruction in the program, a high level is applied to an output line, labeled "READ," from the memory register 122 to a logical and circuit 126 to which also is applied the FS–2 state and an output level from a flip-flop 128 associated with the stack memory 16. The flip-flop 128 is arranged to indicate, when in the reset state, that the stack memory 16, which is time shared with the arithmetic units, is clear for doing a memory access. The output of the logical and circuit 126 is applied to the control unit 106 to advance it to the FS–3 state by an SP.

During the FS–3 state, the address in the instruction word now in the register 122 is transferred by a gate 130 to the address register 118. The FS–3 state is also applied to the gate 120 so that the next SP causes the addressed operand in the main memory 10 to be read into the memory register 122 where it is ready for transfer to the stack memory 16.

At this point it is necessary to understand the concept of the stack memory as applied to the present computing system. As pointed out in the above-identified copending application, certain advantages accrue in automatic programming if operands can be stacked in a temporary storage and then made available for use in performing arithmetic operations in the reverse order in which they are placed in the stack. Where the stack memory is to function to store operands associated with only one program at a time, all that is required is some means such as a counter for identifying the top position of the stack. Thus the counter provides a means of adding additional operands to the stack or removing them from the stack, always on a last-in, first-out basis.

In the multiprogramming system of the present invention, the stack memory 16 must function to store operands from a number of different programs in a single stack memory 16. Operands must be available from the stack memory 16 for use in the several arithmetic units without the words in one stack getting crossed with the words in any other stack. This is accomplished in a unique manner according to the the teaching of the present invention.

Each position in the stack memory is provided with a link address linking that position in memory with another position in memory. The link address provides a linkage with the next word down in the stack. Thus each word associated with a particular stack in the memory is provided with a link with each of the other words in the stack going from the top or last word in the stack down to the bottom or first word in the stack. A register is provided for identifying the address of a location in the stack memory 16 in which the next operand is to be stored, whether of the same program stack or another program stack. The address of the top of the stack is stored as part of the program control word. Thus whenever a program is interrupted and a new program initiated, the location of the stack is preserved in the program control word. In this way, at any point in the operation, information is available as to where the next operand should be stored, where the last operand is located in the stack, and by means of the link address, where the previous operand placed in the stack is stored.

Referring again to FIGURE 3, a register 132, called the Common List register, normally stores the address of the next available location in the stack memory 16. Initially each position in the stack memory is given a link address which links it to another location in the stack memory. The link address is stored as part of each word storage position in the stack memory. The Common List register 132 is initially provided with the address of the first in the chain of locations formed by the link addresses in the stack memory. The program control word in the register 110 will contain no address because initially there are no operands present in the stack memory to form a stack to which the address in the program word can point.

Before the first operand can be placed in the stack memory 16, the link address associated with the first available memory location in the stack memory 16 must be brought out to provide information on a subsequent fetch operation as to the next location in the chain of positions linked together in the stack memory 16. To this end, during the FS–3 state, the address in the Common List register 132 is transferred by a gate 134 to an address register 136 associated with the stack memory 16. The FS–3 state is also applied to a gate 138 which passes the next SP to the READ input of the stack memory 16, causing the contents of the addressed memory location to be transferred into the stack memory register 140. The link address occupies a portion of the word transferred to the register 140. The remainder of the word is blank at this time but is available for storage of the next operand from the main memory register 122.

During the FS–4 state, the operand in the register 122 is transferred to the register 140 by means of a gate 142. At the same time, the link address in the register 140 is transferred during the FS–4 state through a gate 144 to the Common List register 132. Thus the address of the next available location in the linked chain of memory locations in the stack memory 16 is made available for the next fetch operation. At the same time, the existing address in the Common List register 132 is transferred to the program control word in the register 110 by applying the FS–4 state to a gate 146. Thus the address of the operand in the top of the stack is preserved in the program control word. The address in the program control word identifying the location of the operand previously placed in the stack memory is transferred by means of a gate 148 during the FS–4 state to the link address portion of the word in the stack memory register 140. This provides a link between the operand being placed in the top of the stack and the previous operand placed in the stack of the same program. It should be noted that during the initial operation when the first operand is being placed in the stack memory 16, the address derived from the program control word register 110 and transferred to the register 140 is a blank.

The operand word together with the link address to the previous operand word now stored in the register 140, is stored in the stack memory 16 by the next SP passed by a gate 148 during the FS–4 state to the WRITE input of the memory 16. This completes the read operation in which an operand is transferred from the main memory to the stack memory. The flip-flop 28 which was set at the time the control unit went into the FS–3 state, to indicate that the stack memory was tied up, is reset by the output pulse from the gate 148.

For reasons which will hereinafter become more apparent, it is desirable to store a flag bit with the operand when it is placed in the stack memory if the operand word is the first operand placed in the stack memory following the transfer of a program control word to the main memory unit. This is accomplished by means of a flip-flop 150 which is set by the pulse derived over the line 108 from the program control unit 26. During the FS–4 state, a gate 152 sets the flag bit in the register 140 when the flip-flop 150 has been set. At the same time, the output of the gate 152 resets the flip-flop 150 so that no flag bit can be set during subsequent transfers of operands from the main memory to the stack memory.

The instructions in addition to providing for a Read operation in which an operand is transferred from the main memory to the stack memory, may also call for an arithmetic or logical operation. The coded operator specifying this operation is transferred from the instruction word in the register 122 to the program control word in the register 110 during the FS–3 state by means of a gating circuit 154. When an operator is encountered as part of the instruction, the fetch operation is terminated with that instruction and an execute operation must then be initiated. The fetch operation is terminated after the control unit 106 reaches the FS–4 state by returning it to the FS–1 state. The resetting is provided by an SP applied through a logical and circuit 156 to the FS–1 state of the control unit 106. The logical and circuit also has applied thereto a high level signal derived from a flip-flop 158 which has been set in response to an operator stored in the memory register 122. The flip-flop 158 is reset at the end of the FS–4 state by the SP passed by a gate 160. The logical and circuit 156 also senses that the control unit 106 is in the FS–4 state by applying the FS–4 level through a logical or circuit 157. In addition, since the program control word must be returned to the program control word memory 24, the logical and circuit senses over the line 159 that the flip-flop 64 (see FIGURE 2) is in its reset state, indicating that the memory 24 is free for a memory access.

When the control unit 106 is returned to the FS–1 state, the level on the line 44 goes high indicating to the control unit 26 that another fetch operation on the same or another program may be initiated.

It should be noted that an operator may be part of an instruction without calling for a Read operation. Under these conditions, after the instruction is placed in the memory register 122 at the conclusion of the FS–2 state, the control unit 106 is advanced directly to the FS–5 state. This is accomplished by means of a logical and circuit 162 which senses that the control unit 106 is in the FS–2 state. It senses that the Read operation is not present as indicated by the output of an inverter 164 connected to the READ output of the instruction in the register 122.

In the FS–5 state, the operator is transferred by the gate 154 to the program control word in the register 110. The FS–5 state is applied to the logical and circuit 156 so that the next SP returns the control unit 106 back to the FS–1 state.

If no operator is present in the instruction, the main memory unit continues in the fetch operation. A sequence of instructions are called out of memory, permitting additional operands to be transferred between the main memory and the stack memory. This continues until an instruction is brought out of the main memory which includes an operator. To this end, when the control unit 106 reaches the FS–4 state in which the operand is transferred to the stack memory through the gate 142, if no operator is present in the instruction, the control unit 106 is returned to the FS–2 state rather than being returned to the FS–1 state. This is accomplished by a logical and circuit 166 to which the SP is applied and which senses that the control unit is in the FS–4 state and that no operator is present. The latter condition is sensed by applying the line from the set condition of the flip-flop 158 through an inverter 168 to the logical and circuit 166. By returning the control unit 106 to the FS–2 state, a new instruction is brought out of the main memory and the entire fetch operation is repeated.

If the instruction calls for a Store operation, an operand is transferred from the top of the stack and placed in the address location of the main memory identified by the address portion of the instruction. The manner in which the Store operation is accomplished can best be understood by reference to FIGURE 4. Since FIGURE 3 and FIGURE 4 are directed to control circuitry associated with the main memory and the stack memory, many of the logic circuits are used in common. All elements in FIGURE 4 bearing the same number as elements in FIGURE 3 are common to both the Read and the Store operations.

Assuming that the control unit 106 is advanced through the FS–1 and the FS–2 states in the manner described above and that an instruction is now placed in the memory register 122 that calls for a Store operation, a high level is set on the line 170. A logical and circuit 172 senses that a Store operation is called for as indicated by the high level on the line 170. The logical and circuit 172 also senses that the control unit is in the FS–2 state and that the stack memory is free as indicated by the output from the flip-flop 128.

After the next SP sets the control unit 106 to the FS–6 state, the address portion of the instruction is transferred by means of the gate 130 to the main memory address register 118. At the same time, the link address in the program word register 110 is transferred by means of a gate 174 to the address register 136 associated with the stack memory 16. It will be recalled that the link address stored as part of the program word identifies the top of the stack, i.e., the last previous operand to have been placed in the stack memory. It should be noted also that the last previous operand placed in the stack was probably derived from an arithmetic unit, not by a Read operation from the main memory. This will be explained more fully as the description proceeds.

The next SP is used to read out the addressed operand and place it in the memory register 140. At the same time, the control unit 106 is advanced to the FS–7 state. During the FS–7 state, the operand is transferred by means of a gate 176 to the input of the register 122 from which it is written into the appropriate address location in the main memory 10. This is accomplished by providing an SP to the WRITE input of the memory through a gate 178 during the FS–7 state.

Since an operand has been removed from the top of the stack in the stack memory 16, the link address must be modified accordingly and the particular location in the stack memory must be made available for the storage of other operands. To this end, during the FS–7 state, the address location of the operand being transferred from off the top of the stack is placed back in the Common List register 132 through a gate 180. At the same time, the address in the Common List register 132 is transferred to the word in the register 140 by a gate 182 to provide a link address linking the particular memory location to the next memory location forming the linked chain of memory locations comprising the stack. At the same time, the former link address is transferred from the register 140 to the program control word in the register 110 through a gate 184. It will be recognized that the operation of taking an operand from the stack and returning it to the main memory involves the reverse process of transferring linked addresses between the Common List register 132 to the program word register 110 and the stack memory.

At the conclusion of the FS–7 state, an SP is applied through a gate 186 to the WRITE input of the stack memory 16 so as to transfer the new link address into the memory location from which the operand was taken.

Since no operator is ever associated with the Store operation in connection with a given instruction, the control unit 106 is always reset to the FS–2 state at the completion of the Store operation. This is accomplished by means of a logical "and" circuit 180 to which is applied the FS–7 state along with an SP for resetting the control unit 106 to the FS–2 state.

It will be seen from the description thus far that program control words can be called out of the program control memory for use in connection with the main memory to do a fetch operation and to transfer operands between the main memory and the stack memory. Once an operand or a series of operands is placed in the stack memory and an operator is encountered, the fetch operation is completed and the main memory is free to operate on another program. The pulse at the output of the logical and circuit 156 (see FIGURE 3) which returns the control unit 106 to the FS–1 state is also transferred by means of a line 182 to the control unit 26 (see FIGURE 2). This pulse is used to set the pair of flip-flops to the condition which indicates that the associated program is now ready for an arithmetic operation. The pulse on the line 182 is applied to a logical and circuit 184 to which also is applied the output of the and gate 50. Since the counter 40 is still in the same count condition that it was in at the time the program word was transferred to the main memory, the output of the gate 50 will be at a high level and the flip-flops 28 and 30 will be set to their condition indicating that that program is ready for transfer to an arithmetic unit.

Similarly, the pulse may be applied to the flip-flops 32 and 34 through a logical and circuit 186 together with the output of the gate 52, and the pulse may be applied to set the flip-flops 36 and 38 through a logical and circuit 188 to which is applied the output of the gate 54. Thus depending upon the condition of the counter 40, the appropriate pair of flip-flops is set by the pulse on the line 182.

At the same time, it is necessary that the program word stored in the register 110 (see FIGURE 3) be returned to the program control memory 24. To this end, the pulse on the line 182 is applied to the gate 68 thus transferring the address established by the counter 40 to the address register 70. The output of the register 110 is coupled to the input of the memory register 74 over a line 190 by opening a gate 191 in response to the pulse on the line 182. The same pulse is applied through a delay circuit 192 (see FIGURE 2) to the WRITE input of the memory 24, thus transferring the program word now in the register 74 back into the memory 24. The output of the delay circuit 192 is also used to reset the flip-flop 64, indicating that the program control memory 24 is ready for another memory access.

An execute operation may be initiated by any one of the arithmetic units whenever one of the arithmetic units is not in use. An arithmetic unit and associated control circuitry is shown in more detail in FIGURE 5. The arithmetic unit includes a control unit 200 similar to the control unit 106 associated with the main memory. When the control unit 200 is in its initial state, designated ES–1, it indicates that the associated arithmetic unit is not in use and is free to perform arithmetic operations. The ES–1 state is applied to a priority gating circuit 202 to which also are applied the corresponding lines from the other arithmetic units. When more than one of the arithmetic units is free, the priority gating means ensures that only one of the arithmetic units is linked to the program control memory 24 and associated control unit 26 at one time. The output of the priority gating circuit is the line 60 which goes to the control unit 26 as seen in FIGURE 2.

As described above in connection with FIGURE 2, a high level on the line 60 causes the control unit 26 to find a program control word associated with the program in which the fetch operation has been completed and which is ready for an execute operation. When this is accomplished, a program control word is transferred by the gate 102 through a line 204 back to the priority gating circuit 202. The priority gating circuit routes the information to a program control word register 206 in the particular arithmetic unit.

At the same time the program word is being transferred over to the register 206, the gating pulse derived at the output of the logical and circuit 104 is transmitted over a line 208 (see FIGURE 2) to the priority gating circuit 202 from which it is routed to the control unit 200 of the particular arithmetic unit. This pulse advances the control unit 200 to the ES–2 state.

Nothing happens during this state in the arithmetic unit. However, the ES–1 level is changed to the gating circuit 202, releasing the priority gating circuit so that other arithmetic units can communicate with the program control memory 24. During the ES–2 state, the particular arithmetic unit is in a standby operating condition awaiting release of the stack memory 16, which may be operating at the time in combination with the main memory or with one of the other arithmetic units.

Since the arithmetic unit is now in a condition to process operands in the stack, the pair of flip-flops associated with the particular control word must both be placed in the set state to indicate that the program word in the associated position in the memory 24 is being used in an arithmetic unit. The manner in which this is accomplished is shown in FIGURE 2. The flip-flops 28 and 30 are set by the output of a logical and circuit 201 to which the line 208 is applied together with the output of the gate 84. The flip-flops 32 and 34 are set by a logical and gate 203 to which the line 208 and the output of the gate 86 are applied. The flip-flops 36 and 38 are set by logical and circuit 205 to which the line 208 and the output of the gate 88 are applied. In this way, the pair of flip-flops associated with the address location in the program control memory from which the program control word was derived for the arithmetic unit are both placed in the set state, indicating that the associated program control word is not available for any other operation within the computing system.

As pointed out in connection with FIGURE 3, the stack memory has associated therewith a flip-flop 128 which is set whenever the stack memory is involved in a memory cycle operation and which is reset whenever the stack memory is free to do another memory cycle operation. If the flip-flop 128 is in its reset state, indicating that the stack memory 16 is clear, the control unit 200 can be advanced to the ES–3 state.

A logical and circuit 210 gates an SP to the control unit 200 to advance it to the ES–3 state whenever it senses that all the input conditions are true. The inputs to the logical and circuit 210 include the ES–2 level, the level derived from the flip-flop 128 indicating that the stack memory 16 is free and that an operator requiring two operands is present in the program control word register 206. The operator portion of the program control word in the register 206 is sensed by a decoder 212.

One other condition must be sensed by the logical and circuit 210 before the control unit 200 is advanced from the ES–2 state to the ES–3 state. This condition is that no operands are in the arithmetic unit, as is true in the initial stage of the operation. The arithmetic unit itself includes an A-register 214 and a B-register 216 in which the two operands entering into an arithmetic operation are stored. The two registers are coupled to an adder 218, the output of which is fed back into the B-register 216. Thus the B-register 216 functions as an accumulator.

An Occupancy flip-flop 220 is associated with the A-register 214 and an Occupancy flip-flop 222 is associated with the B-register 216. The Occupancy flip-flops are arranged to be set whenever an operand is present in the associated register and to be reset whenever the associated register does not contain an operand. A logical and circuit 224 senses when both flip-flops are in the reset condition, indicating that both registers are empty, the output of the logical and circuit 224 being applied to the logical and circuit 210. With all conditions being satisfied on the input of the logical and circuit 210, the next SP advances the control unit 200 from the ES–2 state to the ES–3 state.

During the ES–3 state and the sequential ES–4 state of the control unit 200, an operand is removed from the top of the stack for the particular program under control of the word in the register 206. The operand is then placed in the B-register 216. To this end, the ES–3 state is applied to a gate 226 through a logical or circuit 227, causing transfer of the link address portion of the program word 206 to the memory address register 136 associated with the stack memory 16. The ES–3 state is also applied to the gate 120 on the READ input of the stack memory 16 so that the addressed operand is read out to the memory register 140.

The control unit 200 now advances to the ES–4 state with the generation of the SP at the end of the ES–3 stated. A gate 228 transfers the operand portion of the word in the memory register 140 to the B-register 216 during the ES–4 state. At the same time, the link address portion of the word in the register 140, identifying the address of the next operand down in the stack, is transferred by a gate 230 from the memory register 140 to the register 206 to change the program control word. Since reading out an operand from the stack memory makes this memory location again available for storage of another operand, the existing address in the program control word in the register 206 is transferred by a gate 232 to the Common List register 132 during the ES–4 state. At the same time, a new link address is provided for the addressed location in the stack memory by transferring the address in the Common List register 132 through the gate 182 to the link address portion of the register 140. At the conclusion of the ES–4 state, the link address is written back into the stack memory 16 by an SP applied to the WRITE input through the gate 148. It will be noted that the removal of an operand from the top of the stack of a particular program and feeding it to the A or B-registers in the arithmetic unit is substantially identical to the store operation described above in which the operand is taken from the top of the stack and placed in the main memory.

It should also be noted that at the start of the ES–3 state, the flip-flop 128 is set by the output of the logical and circuit 210 through a logical or circuit 233, indicating that the stack memory is now involved in a memory cycle. The output pulse from the gate 148 resets the flip-flop 128, indicating that the memory cycle is completed and the stack memory is available for another memory access. This may be initiated by another program control word in another arithmetic unit or in the main memory unit. It should also be noted that since an operand has now been placed in the B-register 216, at the end of ES–4 state, the Occupancy flip-flop 222 is set by means of an SP passed by a gate 236 to the flip-flop 222.

In order to bring in the next operand into the A-register 214, the control unit 200 must be advanced to the ES–5 state. This is accomplished by a logical and circuit 238 which passes an SP to set the control unit 200 to the ES–5 state when all other conditions on the input are true. One input to the logical and circuit 238 is derived from the flip-flop 128, indicating that the stack memory is free to do a memory access operation. Another input is derived from the ES–4 state, indicating that the control unit 200 is ready to advance from the ES–4 state to the ES–5 state. The logical and circuit 238 also senses that there is an operator requiring two operands present in the program control word in the register 206. Also by means of a logical and circuit 240, the conditions of the Occupancy flip-flops 220 and 222 are determined to be in the proper condition, namely, with the flip-flop 220 reset and the flip-flop 222 set. This indicates that the B-register 216 is occupied with an operand but that the A-register 214 is not occupied. With all conditions true, the control unit 200 is advanced to the ES–5 state.

During the ES–5 and the subsequent ES–6 state, the above operation described in connection with the ES–3 state and the ES–4 state is repeated with the exception that the operand is now transferred by means of a gate 242 into the A-register 214. The flip-flop 220 is set by the SP at the end of the ES–6 state by means of a gate 244.

With both the A-register and the B-register loaded with operands, the arithmetic unit is ready to proceed with the required operation as designated by the operator in the program word stored in the register 206. By way of example only, it may be assumed that this operator calls for an addition. The output of the decoder 212 indicating an add operation is applied to a logical and circuit 241 together with the ES–6 state. The output of a logical and circuit 243 which senses that both the Occupancy flip-flops 220 and 222 are set is also applied to the input of the logical and circuit 241. This indicates that the A and B-registers are now loaded with operands.

During the ES–7 state, the adder 218 is activated producing an addition of the operands in the A-register and the B-register with the result being transferred back into the B-register 216. At the same time, the Occupancy flip-flop 220 is reset, indicating that the A-register 214 is not occupied at the conclusion of the add operation.

According to one feature of the present invention, an operation is repeated on a succession of operands to avoid the necessity of bringing in a new operator each time a new operation is to be executed by the arithmetic unit. As mentioned above, the first operator placed in the stack memory during a fetch operation has a flag bit inserted by means of a flip-flop 150 and a gate 152 (see (FIGURE 3). Since operands are removed from the stack in the reverse order in which they are placed in the stack, this flag bit will not be encountered in the arithmetic unit until all subsequent operands placed in the stack have been transferred to the arithmetic unit. A flip-flop 246 is used to store the flag bit received in the operand in the A-register. The flip-flop 246 is set by a pulse passed by a logical and circuit 248 to which is applied the ES–6 state and an SP pulse together with the level derived from the flag bit position of the operand in the A-register 214. The output of the logical and circuit 248 sets the flip-flop 246.

Assuming that the flag bit is not present and the flip-flop 246 remains in its initial state, another operand is derived from the stack memory 16 and the arithmetic operation is repeated. This requires that the control unit 200 be returned to the ES–5 state. A logical and circuit 250 senses that the flip-flop 246 is unchanged and senses that the add operation is complete as derived by an output level from the adder 218. It also senses that the control unit 200 is in the ES–7 state. If all conditions are true, the output of the logical and circuit 250 provides a high level through a logical or circuit 252 to the logical and circuit 238 for resetting the control unit 200 to the ES–5 state. Operation is then repeated in the manner described above by the control unit 200 advancing from the ES–5 state through the ES–6 and ES–7 states.

If the next operand derived from the stack memory has the flag bit present, at the end of the ES–6 state, the flip-flop 246 is set. Thus at the end of the add cycle, the control unit 200 will not return to the ES–5 state. Instead, by means of the output of a logical and circuit 254, the control unit 200 is advanced to the ES–8 state. The and gate 254 senses that the flip-flop 128 is clear indicating that the stack memory 16 is available for a memory access. It also senses the output of an and gate 256 to which is applied the ES–7 state, the completion level from the adder 218 and the level from the flip-flop 246. All conditions being true, the control unit 200 is advanced to the ES–8 state by the next SP.

During the ES–8 and ES–9 states of the control unit 200, the resultant operand in the B-register 216 is returned to the top of the statck in the stack memory 16. Thus the operation is substantially the same as the read operation described above in connection with FIGURE 3 in which an operand is transferred from the main memory into the top of the stack memory. The address in the Common List register 132 of the next available memory location in the stack memory is transferred by means of gate 134 to the address register 136 by applying the ES–8 level to the gate 134. The next SP applied to the gate 120 togetehr with the ES–8 state transfers the link address into the memory register 140. During the ES–9 state, the operand in the B-register 216 is transferred by means of a gate 258 to the memory register 140. At the same time, the link address in the register 140 is transferred to the Common List register 132 through the gate 144, the address indicating the new top of the stack is transferred from the Common List register 132 through a gate 260 into the program control word stored in the register 206, and the previous address carried in the program word is transferred by a gate 262 to the link address portion of the word in the memory register 140. The next SP passed by the gate 148 during the ES–9 state writes the operand and link address into the stack memory 16.

Since the program control word has been modified during the arithmetic operation, it must be returned to the program control word memory 24 in its modified condition. This is accomplished by advancing the control unit 200 to the ES–10 state. A logical and circuit 264 is used to set the control unit 200 to the ES–10 state. The logical and circuit 264 senses that the control unit is in the ES–9 state and that the flip-flop 64 (see FIGURE 2) is reset as indicated by a high level on the line 157. The flip-flop 64 is in the reset state when the program control memory 24 is clear for a memory access.

With the control unit 200 in the ES–10 state, the program control word in the register 206 is transferred by means of a gate 266 to the memory register 74 over the line 268. Once placed in the memory register 74, the program control word must be returned to the program control memory 24. It is not necessary that that word be returned to the identical address position from which it originated prior to the arithmetic operation. It is only necessary that it be returned to a location in the program control memory 24 from which a program control word has been transferred to one of the arithmetic units. This condition, as noted above, is indicated by the fact that both flip-flops associated with a particular position in the program control memory 24 are in the set state.

To address such a location in the program control memory 24, the ES–10 level from the arithmetic unit is applied to the program control unit 26, as shown in FIGURE 2. The ES–10 level from any of the arithmetic units initiates an address operation for restoring the program control word to the program control memory 24.

To this end, the set conditions of the flip-flops 28 and 30 are sensed by a logical and circuit 270 together with the first output line from the decoder 82. Similarly, a logical and circuit 272 senses the set conditions of the flip-flops 32 and 34 together with the second output line from the decoder 82. A logical and circuit 274 similarly senses the set conditions of the flip-flops 36 and 38 together with the third output line from the decoder 82. The output of the logical and circuits 270, 272 and 274 are applied to a logical or circuit 276, the output of which is applied through an inverter 278 to a logical and circuit 280. The ES–10 level from the arithmetic unit is also applied to the logical and circuit 280, the output of which is applied through a logical or circuit 282 to the gate 94. In this manner, the program counter 42 is advanced by pulses from the pulse generator 66 passed by the gate 94 until one of the logical and circuits 270, 272, or 274 indicates that the address in the program counter 42 corresponds to the location in the program control memory in which the associated pair of flip-flops are both in the set condition. When the program counter 42 has been advanced to this address, the gate 94 is closed preventing further counting of the program counter 42.

At the same time, the output from the logical or circuit 276 is applied together with the ES–10 level to a logical and circuit 284, the output of which is applied to a gate 286 which gates the address in the program counter 42 to the address register 70. The output of the logical and circuit 284 also is applied to a gate 288 which gates the next pulse from the generator 66 to the WRITE input of the program control memory 24, thus transferring the program control word in the memory register 74 back into the program control memory 24. The same pulse is used to reset the flip-flop 64, indicating that the program control memory 24 is clear for another memory access. The same pulse is used to reset one of the flip-flops 28, 30, or 32. The flip-flop 28 may be reset through a logical and circuit 290 to which the output of the logical and circuit 270 is applied. Similarly, the flip-flop 32 may be reset by the output of a logical and circuit 292 by the pulse derived from the gate 288 when the output of the and gate 272 is at a high level. The flip-flop 36 may be reset by applying the pulse derived from the gate 288 to a logical and circuit 294 to which also is applied the output of the logical and circuit 274. In this way, when the program control word is placed back in the program control memory 24, the associated pair of flip-flops is returned to the required condition to indicate that the particular program is ready to do another fetch operation.

The control unit 200 in the arithmetic unit is returned to the ES–1 state by the pulse derived from the output of the gate 288 transmitted over line 296 to a gate 298, to which is also applied the ES–10 state. The output of the gate 298 resets the control unit 200 to the ES–1 state, making the arithmetic unit available for performing an arithmetic operation under another program.

What is claimed is:

1. A multiprogramming computer comprising first storing means for storing instructions and operands in coded form relating to a plurality of separate programs, means for selecting and transferring instructions and operands out of the storage means in response to coded addresses, temporary storage means for storing a plurality of operands in addressable locations, second storing means for storing a plurality of program control words in coded form, each program control word having information related to the associated program as to the address of the next instruction in said first storing means, the address of the last operand placed in the temporary storage means, and the operation called for by the last instruction, an address register for storing the address of the next location in the temporary storage means available for receiving an operand, fetch control means responsive to a program control word from the program control word storing means for sensing the instruction addressed by the program control word, changing the address portion of the program control word to the address of the next instruction, and transferring the operator portion of the instruction to the program control word, and operand storage control means responsive to the instruction and the program control word including means for transferring an operand from the first storing means to the address in the temporary storage means identified by the address register, means for transferring the address of the last operand placed in the temporary storage means from the program control word and storing it together with the operand in the temporary storage means, means for replacing the last operand address portion of the program control word with the address of the immediate operand as derived from said register, and means for setting the register to the address of the next available location in the temporary storage means.

2. Apparatus as defined in claim 1 further comprising a plurality of arithmetic units, each unit including means for storing two operands and means for performing arithmetic operations on said operands to produce a resultant operand, execute control means responsive to a program control word from the second storing means including means for selecting and transferring a first operand from the address location in the temporary storage means identified by the address in the program control word to the arithmetic unit, means for transferring the address in the address register to the temporary storage means, means for replacing the address in the program control word with the address stored with the selected operand in the temporary storage means, and means for setting the register to the temporary storage address of the selected operand.

3. Apparatus as defined in claim 2 wherein the execute control means includes means for selecting and transferring an additional operand from the temporary storage means in response to the address in the program control word to the same arithmetic unit, and means for effecting an arithmetic operation in response to the coded operator in the program control word on the two operands in the arithmetic unit.

4. Apparatus as defined in claim 3 further including means for setting a flag bit in the first operand word transferred from the first storing means to the temporary storage means in response to a particular program word, and means for repeating an execute operation by the execute control means in response to a single program control word until an operand with a flag bit is transferred from the temporary storage means to the second one of the storage means in the arithmetic unit.

5. In a multiple-program computer, apparatus for storing a plurality of operands for a plurality of programs in a temporary addressable storage unit on a last-in, first-out basis, said apparatus comprising means for storing a plurality of program control words, each program control word having an address portion, a first register for storing a program control word, means for selectively transferring a program control word from the storing means to the first register, a second register for storing a word to be written into or read out of the temporary storage unit, a third register for storing an address, each storage position in the temporary storage unit having an address of another storage position stored as part of the word in that position, first control means for effecting transfer of operands into the temporary storage unit including means responsive to the address in the third register for selecting a position in the temporary storage unit and transferring the word in the selected position to the second register, means for transferring an operand to an operand portion of the second register, means for transferring the address portion of the word in the second register to the third register, transferring the address in the third register to the first register, and transferring the address in the first register to an address portion of the second register, and means for transferring the operand and modified address in the second register back to the selected position of the temporary storage unit, and second control means for transferring operands out of the temporary storage unit including means responsive to the address in the first register for selecting a position in the temporary storage unit and transferring the word in the selected position to the second register, means for transferring the address portion of the selected word placed in the second register to the address portion of the first register, transferring the address in the first register to the third register, and transferring the address in the third register to the second register, and means for transferring the modified address in the second register back into the selected position in the temporary storage unit.

6. In a multiple-program computer, apparatus for storing a plurality of operands for a plurality of programs in a temporary addressable storage unit on a last-in, first-out basis, said apparatus comprising a first register for storing a program control word, the program control word having an address portion, a second register for storing a word to be written into or read out of the temporary storage unit, a third register for storing and address, each storage position in the temporary storage unit having an address of another storage position stored as part of the word in that position, first control means for effecting transfer of operands into the temporary storage unit including means responsive to the address in the third register for selecting a position in the temporary storage unit and transferring the word in the selected position to the second register, means for transferring an operand to the second register, means for transferring the address portion of the word in the second register to the third register, transferring the address in the third register to the first register, and transferring the address in the first register to the second register, and means for transferring the operand and modified address in the second register back to the selected position of the temporary storage unit, and second control means for transferring operands out of the temporary storage unit including means responsive to the address in the first register for selecting a position in the temporary storage unit and transferring the word in the selected position to the second register, means for transferring the address portion of the selected word placed in the second register to the address portion of the first register, transferring the address in the first register to the third register, and transferring the address in the third register to the second register, and means transferring the modified address in the second register back into the selected position in the temporary storage unit.

7. In a multiple-program computer, apparatus for storing a plurality of operands for a plurality of programs in a temporary addressable storage unit on a last-in, first-out basis, said apparatus comprising a first register for storing a program control word, the program control word having an address portion, a second register for storing a word to be written into or read out of the temporary storage unit, a third register for storing an address, each storage position in the temporary storage unit having an address of another storage position stored as part of the word in that position, first control means for effecting transfer of operands into the temporary storage unit including means responsive to the address in the third register for selecting a position in the temporary storage unit and transferring the word in the selected position to the second register, means for transferring an operand to the second register, means for transferring the address portion of the word in the second register to the third register, transferring the address in the third register to the first register, and transferring the address in the first register to the second register, and means for transferring the operand and modified address in the second register back to the selected position of the temporary storage unit, and second control means for transferring operands out of the temporary storage unit including means responsive to the address in the first register for selecting a position in the temporary storage unit and transferring the word in the selected position to the second register.

8. In a multiple-program computer, apparatus for storing a plurality of operands for a plurality of programs in a temporary addressable storage unit on a last-in, first-out basis, said apparatus comprising a first register for storing a program control word, the program control word having an address portion, a second register for storing a word to be written into or read out of the temporary storage unit, a third register for storing an address, each storage position in the temporary storage unit having an address of another storage position stored as part of the word in that position, first control means for effecting transfer of operands into the temporary storage unit including means responsive to the address in the third register for selecting a position in the temporary storage unit and transferring the word in the selected position to the second register, means for transferring an operand to the second register, means for transferring the address portion of the word in the second register to the third register, transferring the address in the third register to the first register, and transferring the address in the first register to the second register.

9. Computer apparatus comprising a temporary storage facility, means for transferring a sequence of operands into the temporary storage facility, the first operand of the sequence having a flag bit indicating that it is the first operand in a sequence, an arithmetic unit including means for storing two operands and means for performing arithmetic operations on the two operands to produce a resultant operand, means for transferring the operands from the temporary storage facility to the arithmetic unit in the reverse sequence in which they were transferred into the temporary storage, means for initiating a particular arithmetic opeation on the first two operands in the sequence and repeating the same arithmetic operation on each subsequent operand in the sequence with each of the resultant operands as they are produced, means responsive to the flag bit when encountered in an operand transferred from the temporary storage facility to the arithmetic unit for interrupting further transfer of operands to the arithmetic unit and transferring the last resultant operand back to the temporary storage facility.

10. A multiprogramming computer comprising a main memory for storing operands and instructions related to a plurality of programs, each instruction having an address portion and a portion designating an arithmetic operation, a temporary storage facility for storing a plurality of operands, at least one arithmetic unit for performing arithmetic and logical operations, means for storing a plurality of program control words, there being a program control word associated with each program to be run by the computer, means for indicating when the main memory is idle, means responsive to said indicating means for selecting a program word from the program control word storing means and initating the readout of an instruction from the main memory in response to address information in the selected program control word, means responsive to the instruction word and the program control word for effecting transfer of an operand between the main memory and the temporary storage word, means for storing the portion of the instruction designating an arithmetic operation as part of the program control word, means for indicating when an arithmetic unit is idle, and means responsive to said last named indicating means for selecting a program word from the program control word storing means and initating an operation designated by the program control word on operands in the temporary storage facility in the idle arithmetic unit.

11. A multiple-program computer comprising a main addressable storage unit for storing operands and instructions, a temporary storage unit for storing operands in addressable locations, a plurality of arithmetic units for performing arithmetic and logic opeartions on pairs of operands and generating a resultant operand, means for storing a plurality of program control words, means for selecting and reading out a program control word from the storing means, means responsive to address information in a selected program control word for fetching instructions from the main storage unit one instruction at a time, means responsive to certain instructions when fetched from the main memory for transferring operands between the main storage unit and the temporary storage unit, means responsive to an instruction designating an arithmetic operation for terminating the fetching of further instructions and storing the arithmetic operation designated by the instruction as part of the selected program control word in the program word storing means, and means responsive to a selected control word having an arithmetic operation stored as part of the word for transferring operands between the temporary storage unit and any one of the arithmetic units.

12. A multiple-program computer comprising a main addressable storage unit for storing operands and instructions, a temporary storage unit for storing operands in addressable locations, means for storing a plurality of program control words, means for selecting and reading out a program control word from the storing means, means responsive to address information stored in a selected program control word for fetching instructions from the main storage unit one instruction at a time, means responsive to certain instructions when fetched from the main memory for transferring operands between the main storage unit and the temporary storage unit, and means responsive to an instruction designating an arithmetic operation for terminating the fetching of further instructions and storing the arithmetic operation designated by the instruction as part of the selected program control word in the program word storing means.

13. A computer comprising a first addressable storage means for storing a plurality of coded words, each word having an operand portion, a link address portion, and a flag bit, an address storage register associated with the first storage means, a second addressable storage means for storing a plurality of coded program control words, each word having a stack address portion and an arithmetic operator portion, a plurality of arithmetic units, each unit including a first register for storing a program control word, second and third registers for storing a pair of operands, and means for performing arithmetic operations on the pair of operands and storing the result in the third register, means for transferring a program control word from the second storage means to the first register in any one of the arithmetic units, and means for transferring a succession of words from the first storage means to the second register of any of the arithmetic units including means for addressing and reading out a word from the first storage means in response to the stack address portion of a program control word in the first register of the arithmetic unit, means for placing the operand portion of the word read out of the first storage means into the second register, means for shifting the link address portion of the word read out of the first storage means to the first register, shifting the stack address portion of the program control word in the first register to the address register, and shifting the contents of the address register to the first addressable storage means to replace the link address portion in the addressed word, means controlled in response to the arithmetic operator portion of the control word in the first register for actuating the arithmetic operation means with each operand placed in the second register to generate a resultant in the third register, means detecting a flag bit in a word read out of the second storage means for interrupting further arithmetic operations and placing the resultant operand back into the first addressable storage means.

14. A computer comprising a first addressable storage means for storing a plurality of coded words, each word having an operand portion, a link address portion, and a flag bit, an address storage register associated with the first storage means, a second addressable storage means for storing a plurality of coded program controls words, each word having a stack address portion and an arithmetic operator portion, a plurality of arithmetic units, each unit including a first register for storing a program control word, second and third registers for storing a pair of operands, and means for performing arithmetic operations on the pair of operands and storing the result in the third register, means for transferring a program control word from the second storage means to the first register in any one of the arithmetic units, and means for transferring a succession of words from the first storage means to the second register of any of the arithmetic units including means for addressing and reading out a word from the first storage means in response to the stack address portion of the program control word in the first register of the arithmetic unit, means for placing the operand portion of the word read out of the first storage means in the second register, means for shifting the link address portion of the word read out of the first storage means to the first register, shifting the stack address portion of the program control word in the first register to the address register, and shifting the contents of the address register to the first addressable storage means to replace the link address portion in the addressed word, and means controlled in response to the arithmetic operation portion of the control word in the first register for actuating the arithmetic operation means with each operand placed in the second register to generate a resultant in the third register.

15. A computer comprising a first addressable storage means for storing a plurality of coded words, each word having an operand portion, a link address portion, and a flag bit, an address storage register associated with the first storage means, a second addressable storage means for storing a plurality of coded program control words, each word having a stack address portion and an arithmetic operator portion, a plurality of arithmetic units, each unit including a first register for storing a program control word, second and third registers for storing a pair of operands, and means for performing arithmetic operations on the pair of operands and storing the result in the third register, means for transferring a program control word from the second storage means to the first register in any one of the arithmetic units, and means for transferring a succession of words from the first storage means to the second register of any of the arithmetic units including means for addressing and reading out a word from the first storage means in response to the stack address portion of the program control word in the first register of the arithmetic unit, means for placing the operand portion of the word read out of the first storage means in the second register, and means for shifting the link address portion of the word read out of the first storage means to the first register, shifting the stack address portion of the program control word in the first register to the address register, and shifting the contents of the address register to the first addressable storage means to replace the link address portion in the addressed word.

16. Apparatus for storing a plurality of operands related to a plurality of separate programs, comprising addressable storage means having a plurality of separately addressable word storage locations, each word position being arranged to store an operand and a link address, the link address in each position identifying another position in the storage means, a first register for storing the address of a word position available for storage of an operand, a second register for storing the address of the last operand stored in the storage means related to a particular program, and first control means for effecting transfer of an operand into the storage means including means responsive to the address in the first register for storing an operand as it is received in the particular location in the storage means identified by the address in the first register, and means operative prior to receiving the next operand for switching the address in the first register to the second register, switching the address in the second register to the link address portion of the particular location of the storage means in which the operand is stored, and switching the prior link address from the storage means to the first register.

17. Apparatus as defined in claim 16 further comprising control means for effecting transfer of an operand out of the storage means including means responsive to the address in the second register for reading out an operand from a particular location in the storage means, and means for switching the address in the second register to the first register, switching the address in the first register to the link address portion of the particular location of the storage means from which the operand is read out, and switching the prior link address from the storage means to the second register.

18. A multiprogram computer comprising a main storage means for storing the operands and instructions relating to a plurality of separate programs, an arithmetic unit for processing operands, a stack memory unit for temporarily storing operands used by the arithmetic unit, means for storing a plurality of program control words, each program control word having a link address portion, an instruction address portion, and an operator portion, means associated with each program control word in the storing means for indicating that the program control word is available to control transfer of operands between the main storage means and the stack memory unit or the program word is available to control the transfer of operands between the arithmetic unit and the stack memory unit, first counter means for addressing each program control word in sequence and sensing the associated indicating means to identify a program control word available for controlling transfer of operands between the main storage and the stack memory unit, second counter means for addressing each program control word in sequence and sensing the associated indicating means to identify a program control word available for controlling transfer of operands between the arithmetic unit and the stack memory unit, first control means including means storing a program control word for fetching instructions and effecting transfer of operands from the main storage means to the stack memory unit and in response to the information in the program control word, means responsive to the first counter means for transferring a program control word to the first control means, second control means including means storing a program control word for transferring operands from the stack and executing arithmetic operations in response to information in the program control word, and means responsive to the second counter means for transferring a program control word to the second control means.

No references cited.

ROBERT C. BAILEY, *Primary Examiner.*

R. B. ZACHE, *Assistant Examiner.*